United States Patent

Masciantonio et al.

[15] 3,668,121

[45] June 6, 1972

[54] INTUMESCENT FIRE-RETARDING COMPOSITION COMPRISING AMMONIUM DERIVATIVES OF GLYOXYLIC ACID

[72] Inventors: Philip X. Masciantonio, Penn Township, Westmoreland County; Edward L. Mihelic, Penn Hills Township, Allegheny County, both of Pa.

[73] Assignee: United States Steel Corporation

[22] Filed: Aug. 10, 1970

[21] Appl. No.: 62,721

[52] U.S. Cl..............................252/8.1, 106/15 FP, 117/136, 117/137
[51] Int. Cl.........................................C09d 5/18, C09k 3/28

[58] Field of Search.................252/8.1; 106/15 FP; 117/136, 117/137; 260/526 R, 534 M, 2.5 FP

[56] References Cited

UNITED STATES PATENTS 2,347,031    4/1944    Cupery...................................117/137

*Primary Examiner*—John T. Goolkasian
*Assistant Examiner*—D. J. Fritsch
*Attorney*—Gene Harsh

[57] ABSTRACT

Water-soluble mono- and diammonium derivatives of glyoxylic acid are prepared and used as intumescent fire-retarding and heat-insulating materials.

7 Claims, No Drawings

INTUMESCENT FIRE-RETARDING COMPOSITION COMPRISING AMMONIUM DERIVATIVES OF GLYOXYLIC ACID

BACKGROUND OF THE INVENTION

The mono- and diammonium derivatives of glyoxylic acid are not new to chemical literature, although the structure of these compounds appears not to have been definitely resolved. Debus, who discovered glyoxylic acid in 1856 (Phil. Mag., 12, 361 [1856] ), speculated that the product of reaction of equimolar amounts of ammonia and glyoxylic acid was the ammonium salt:

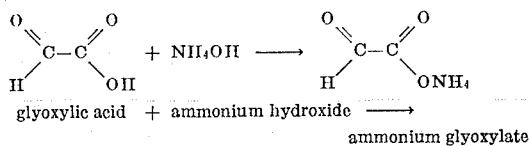

glyoxylic acid + ammonium hydroxide ⟶ ammonium glyoxylate

Later experimenters (W. H. Perkin in Debus, J. Chem. Soc. 85, 1386 [1904] ) speculated that this was incorrect and that the correct reaction was:

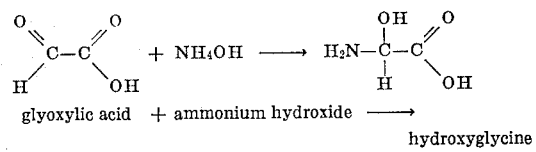

glyoxylic acid + ammonium hydroxide ⟶ hydroxyglycine

It appears that little interest has existed in this compound since its discovery by Debus, and his assignment of structure has persisted throughout subsequent literature. In 1934, for example, Desnuelle and Fromageot (Bull. Soc. Chem., 59, 700 [1934] ) reported the preparation of glycine by catalytic hydrogenation of ammonium glyoxylate.

Various organic and inorganic compounds, both alone and in combination with each other, have been tested as intumescent agents. Ammonium phosphate, vermiculate, casein, starch, benzene sulfonylhydrazide, polyamide resins, paraformaldehyde, and glycine have all been shown to produce some degree of intumescence, but only a few are of real value. A combination of glycine, starch, and ammonium phosphate, for example, has given good results, but the use of glycine is limited by its high cost. In other cases, excessive smoke production is a problem, as is the production of toxic gaseous pyrolysis products.

Accordingly, it is an object of this invention to provide low-cost intumescent agents, which, on exposure to flame or heat, evolve flame-extinguishing gaseous products, and which concomitantly polymerize to produce an infusible, thermally stable polymer foam that acts as a barrier to dissipate heat and to prevent flame spread.

It is a further object to provide intumescent agents that are comparatively non-smoking and which do not, during pyrolysis, yield significant amounts of particularly toxic gaseous products such as hydrogen cyanide, cyanogen, and the like, and which therefore are useful as components alone or in combination with other intumescent or other agents in fireproofing formulations.

It is also an object of this invention to provide coating compositions suitable for coating on substrates to provide fire-retarding and heat-insulating properties.

SUMMARY OF THE INVENTION

Novel intumescent fire-retarding and heat-insulating agents comprising the mono- and diammonium derivatives of glyoxylic acid are presented. These compounds are useful in the fireproofing of structural members, especially in high rise structures. They may be used alone or they may be combined with other intumescent agents, fillers, colorants, thixotroping agents, anti-mildew agents, and agents to improve water resistance. Application may be by simple coating of the member to be fireproofed as by spraying, brushing, dipping, etc. The characteristic of these compounds which makes them excellent fire-retarding and heat-insulating agents is their ability to produce a voluminous polymeric flame-retarding thermoset foam which does not itself flame and most importantly, evolves a flame-extinguishing gaseous product, but which gives off very little smoke or noxious fumes.

DETAILED DESCRIPTION

Studies were conducted to determine the structure of the ammonia derivatives of glyoxylic acid. As stated above, two structures have been proposed; ammonium glyoxylate

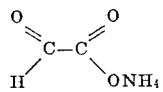

and hydroxyglycine (hydroxyamino acetic acid).

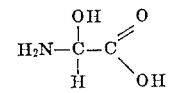

The results of our studies support the isomeric structure, hydroxyglycine, for the compound prepared from one mole of ammonia.

The hydroxyglycine compound can react with a second mole of ammonia to give the ammonium salt

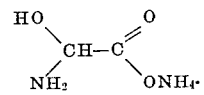

Both of these compounds are thermally unstable, resulting in the elimination of gaseous products and producing a voluminous, thermally stable thermosetting polymer foam.

The compounds of the present invention are prepared by reacting glyoxylic acid with one or two molecular equivalents of ammonia in an aqueous system. The preferred amount of ammonia is that stoichiometric with the glyoxylic acid. The amount of water solvent can range from 20 to 100 weight percent of the glyoxylic acid, the preferred amount being from 50 to 100 weight percent. The reaction is conducted, with cooling, at from 0° to 40° C, the preferred range being from 0° to 10° C. After addition of one molecular equivalent of ammonia is completed, the monoammonium derivative is recovered by filtration, or a second equivalent of ammonia is added to make the diammonium derivative. The diammonium is recovered as a glassy solid by flash evaporation of the water solvent. A crystalline product is obtained by removing 85 to 95 percent of the water by flash evaporation at 45° C and 10 mm Hg. and allowing the syrup to stand for 18 to 24 hours at ambient temperature.

In accordance with the invention, the compounds can be used as the intumescent component alone or in combination with other intumescent agents in formulating fire-retardant paints. Other components of such formulations could include inert fillers, colorants, thixotroping agents, agents that promote water resistance, and agents that prevent mildewing.

Examples of other intumescent agents suitable for use with the compounds of our invention are ammonium phosphate, glycine and starch.

Especially suitable fillers are talc, silica, mica, pyrophyllite, barytes, asbestos, and various metal oxides excepting those of the alkaline earth metals.

Especially suitable colorants are iron oxides, lead chromate and chromium oxide.

Polyvinyl alcohols, carboxy methyl cellulose, and pyrogenic silicas are thixotropic agents which can be advantageously used in conjunction with the compounds of our invention.

A preferred water resistance agent is dimethyl diethoxysilane. Preferred anti-mildew agents are copper 8-quinolinate and bis(tri-n-butyltin) oxide.

In these compositions the mono- or diammonium derivative of glyoxylic acid can comprise from 100 to about 35 weight percent of the composition, with from about 60 to about 45 weight percent of the composition being preferred.

It is not possible to state with particularity the amounts of the other materials which may be present in the composition as this is dependent upon the intended application. Thus, when used in a dry location, mildew and water resisting agents would not be necessary. Colorants may be used in exposed locations but would not be necessary where the coated member will be hidden. In Examples 3 and 4, we have formulated representative compositions using the diammonium derivative of glyoxylic acid alone and in conjunction with other agents, from which it is obvious that the formulation may vary widely, provided always that a minimum of 35 weight percent of the composition is the mono- or diammonium derivative of glyoxylic acid.

While both subject compounds are operable as intumescent agents, the diammonium derivative produces a more voluminous foam because of its greater $NH_3$ content, and is preferred.

The following examples illustrate our invention, but are not intended to be limiting.

EXAMPLE 1

To prepare the monoammonium derivative, glyoxylic acid monohydrate (92 g, 1.0 mole) in water (92 ml) is cooled by a salted ice bath to between 0° and 5° C. A solution (28 percent) of ammonium hydroxide (67.5 ml, 1 mole $NH_3$) is added at a rate sufficient to maintain a temperature of about 5° C. Since the reaction is very exothermic, this requires an addition period of about 1 hour. When addition is complete, acetone (400 ml) is added. The white crystalline product is collected by filtration and dried over calcium chloride under reduced pressure. Melting point of the product is 100° C with decomposition. Product weight is 80 g.

EXAMPLE 2

To prepare the diammonium derivative of glyoxylic acid, the procedure of Example 1 is followed, but twice the amount of ammonium hydroxide is added. The reaction temperature is allowed to rise to 40° C on addition of the second mole of ammonium hydroxide. The reaction solution is flash-evaporated at 45° C and 10 mm Hg until about 90 percent of the water solvent is removed. A thick, syrupy product is obtained, which gradually crystallizes during 24 hours at ambient temperature.

EXAMPLE 3

To demonstrate the intumescent and flame-retarding properties of the subject compounds, a ¼-inch dowel rod is coated with 1/16-inch coating (dry thickness) of the syrupy product of Example 2 and allowed to dry at ambient temperature. Samples of the coated rod and uncoated rod are exposed to the oxidizing flame from a Meeker burner at such a distance that kindling of the uncoated rod occurs in 2 seconds, with burn-through in 1 minute. The coated sample develops a voluminous polymeric foam. There is no kindling after as long as 10 minutes of exposure to the flame.

EXAMPLE 4

The procedure of Example 3 is followed using the following coating formulations prepared by mixing with high speed stirring, the following ingredients with sufficient water to give a syrupy consistency:

| | Formulation (% by weight) | |
|---|---|---|
| | A | B |
| Ammonium hydroxyglycinate | 50.0 | 50.0 |
| Iron Oxide | 18.4 | — |
| Mica (325 mesh) | 15.0 | — |
| Bentonite | 5.0 | — |
| Copper hydroxyquinolinate | 0.2 | — |
| Pyrogenic silica | 2.0 | 2.0 |
| Acrylic emulsion (40% solids) | 23.5 | 30.0 |
| Asbestos | — | 18.0 |
| Water | — | — |

The coating was 1/32-inch thick. Both formulations develop a voluminous foam and do not kindle.

EXAMPLE 5

To prepare a simple intumescent paint, the crystallized product (48 g) of Example 2 is pulverized with bentonite clay (16.0 g) and Bentone-11, a quarternary amine derivative of bentonite clay (2.0 g). The mixture is triturated with water (18 ml) and finally milled in a colloid mill to obtain a highly dispersed homogeneous mixture. The insulative ability of the paint is tested by coating steel cylinders with the above formulation, drying, and exposing the cylinders to a temperature of 1,600° F in an electric furnace. The cylinders are center-bored to accommodate a thermocouple, and the rate of heat transfer to the cylinders is then calculated from temperature data obtained. The results are as follows:

| Dry Coating Thickness, in. | Rate of Heat Transfer at 2 min. Exposure, $Btu/hr/ft^2$ |
|---|---|
| Uncoated | 14,700 |
| 2/32 | 9,000 |
| 5/32 | 1,800 |

As is apparent from the foregoing specification, the method of the present invention is susceptible of being embodied in various attractions and modifications which may differ particularly from those that have been described in the preceding specification and description. For this reason, it is to be understood that the foregoing is intended to be illustrative and is not to be construed as limiting the present invention except as set forth and defined in the appended claims.

We claim:

1. A method of coating articles to render them flame-retarding and heat-resistant comprising applying a coating to said article comprising an intumescent agent selected from the group consisting of the monoammonium and diammonium derivatives of glyoxylic acid and mixtures thereof.

2. The method of claim 1 wherein the intumescent coating is at least 1/32-inch thick.

3. An improved intumescent fire-retarding and heat-insulating composition comprising an intumescent agent selected from the group consisting of the mono- and diammonium derivatives of glyoxylic acid and mixtures thereof, a filler, and a thixotropic agent.

4. The composition of claim 3 wherein the intumescent agent is the diammonium derivative of glyoxylic acid, the inert filler is asbestos, the thixotropic agent is a mixture of pyrogenic silica and an acrylic emulsion.

5. The composition of claim 3 wherein the thixotropic agent is selected from the group consisting of polyvinyl alcohols, carboxymethyl cellulose, pyrogenic silica and mixtures thereof.

6. The composition of claim 3 wherein the filler is selected from the group consisting of talc, silica, mica, pyrophyllite, barytes, asbestos, and metal oxides excepting the oxides of alkaline earth metals and mixtures thereof.

7. The composition of claim 6 wherein a colorant selected from iron oxide, lead chromate and chromium oxide is added.

* * * * *